US010591368B2

(12) United States Patent
Pedder et al.

(10) Patent No.: US 10,591,368 B2
(45) Date of Patent: Mar. 17, 2020

(54) FORCE SENSOR WITH STRAIN RELIEF

(71) Applicant: Apple Inc., Cupertino, CA (US)

(72) Inventors: James E. Pedder, Thame (GB); John Stephen Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/612,922

(22) Filed: Jun. 2, 2017

(65) Prior Publication Data

US 2017/0268942 A1    Sep. 21, 2017

Related U.S. Application Data

(63) Continuation of application No. 14/550,845, filed on Nov. 21, 2014, now abandoned.

(60) Provisional application No. 61/976,285, filed on Apr. 7, 2014, provisional application No. 61/942,021, filed on Feb. 19, 2014, provisional application No. 61/939,257, filed on Feb. 12, 2014, provisional application No. 61/937,465, filed on Feb. 7, 2014, provisional application No. 61/926,905, filed on Jan. 13, 2014.

(51) Int. Cl.
*G06F 3/041* (2006.01)
*G01L 1/18* (2006.01)

(52) U.S. Cl.
CPC ...... *G01L 1/18* (2013.01); *G06F 2203/04105* (2013.01)

(58) Field of Classification Search
CPC .................. G06F 3/0414; G06F 3/047; G06F 2203/04104; G06F 2203/04808; G06F 3/016; G06F 3/0416; G06F 3/04847; G06F 3/0486; G06F 3/0488; G01B 7/16

USPC .......................................................... 345/173
See application file for complete search history.

(56) References Cited

U.S. PATENT DOCUMENTS

| 3,176,241 A | 3/1965 | Hogan |
| 4,423,640 A | 1/1984 | Jetter |
| 4,558,757 A | 12/1985 | Mori |
| 4,577,174 A | 3/1986 | Lemmer |

(Continued)

FOREIGN PATENT DOCUMENTS

| CN | 1659583 | 8/2005 |
| CN | 101477422 A | 7/2009 |

(Continued)

OTHER PUBLICATIONS

"Immersion Announces MOTIV™ Development Platform for Android," retrieved from the Internet: URL:http://ir.immersion.com/releasedetail.cfm?sh_email=no&releaseid=549080, Feb. 10, 2011.

(Continued)

*Primary Examiner* — Insa Sadio
(74) *Attorney, Agent, or Firm* — Brownstein Hyatt Farber Schreck, LLP

(57) ABSTRACT

A transparent force sensor for detecting an applied force on a surface of a device. The transparent force sensor includes a transparent force-sensitive film having an array of strain-relief features oriented along a first direction. The transparent force-sensitive film is formed from a transparent piezoelectric material that exhibits a substantially reduced net charge when strained along a primary direction. The force sensor also includes a display element disposed on one side of the transparent force-sensitive film.

20 Claims, 8 Drawing Sheets

(56) References Cited

U.S. PATENT DOCUMENTS

| | | |
|---|---|---|
| 4,716,393 A | 12/1987 | Logie |
| 4,897,582 A | 1/1990 | Otten et al. |
| 5,052,844 A | 10/1991 | Kendall |
| 5,103,404 A | 4/1992 | McIntosh |
| 5,231,336 A | 7/1993 | van Namen |
| 5,541,372 A | 7/1996 | Bailer et al. |
| 5,734,373 A | 3/1998 | Rosenberg |
| 5,805,138 A | 9/1998 | Brawne |
| 5,999,168 A | 12/1999 | Rosenberg et al. |
| 6,100,874 A | 8/2000 | Schena et al. |
| 6,219,038 B1 | 4/2001 | Cho |
| 6,337,678 B1 | 1/2002 | Fish |
| 6,373,465 B2 | 4/2002 | Jolly |
| 6,388,655 B1 | 5/2002 | Leung |
| 6,492,979 B1 | 12/2002 | Kent |
| 6,518,954 B1 | 2/2003 | Chen |
| 6,747,631 B1 | 6/2004 | Sakamaki |
| 6,816,049 B2 | 11/2004 | Watanabe |
| 6,937,124 B1 | 8/2005 | Nakamura |
| 6,940,494 B2 | 9/2005 | Hoshino et al. |
| 7,031,592 B2 | 4/2006 | Akieda |
| 7,044,681 B2 | 5/2006 | Quenzi et al. |
| 7,091,886 B2 | 8/2006 | DePue |
| 7,152,482 B2 | 12/2006 | Ueno |
| 7,176,897 B2 | 2/2007 | Roberts |
| 7,219,549 B2 | 5/2007 | Honkura et al. |
| 7,245,293 B2 | 7/2007 | Hoshino et al. |
| 7,283,120 B2 | 10/2007 | Grant |
| 7,331,245 B2 | 2/2008 | Nishimura |
| 7,436,396 B2 | 10/2008 | Akieda |
| 7,443,384 B2 | 10/2008 | Harada |
| 7,511,706 B2 | 3/2009 | Schena |
| 7,525,532 B2 | 4/2009 | Liu et al. |
| 7,532,202 B2 | 5/2009 | Roberts |
| 7,557,051 B2 | 7/2009 | Ryu |
| 7,567,232 B2 | 7/2009 | Rosenberg |
| 7,639,232 B2 | 12/2009 | Grant et al. |
| 7,656,388 B2 | 2/2010 | Schena et al. |
| 7,656,393 B2 | 2/2010 | King |
| 7,685,538 B2 | 3/2010 | Fleck et al. |
| 7,692,078 B2 | 4/2010 | Hayashi |
| 7,710,397 B2 | 5/2010 | Krah et al. |
| 7,791,506 B2 | 9/2010 | Riihimaki |
| 7,791,588 B2 | 9/2010 | Tierling et al. |
| 7,825,903 B2 | 11/2010 | Anastas et al. |
| 7,843,277 B2 | 11/2010 | Gregorio et al. |
| 7,877,707 B2 | 1/2011 | Westerman |
| 7,920,225 B2 | 4/2011 | Nishikawa et al. |
| 7,920,694 B2 | 4/2011 | Cruz-Hernandez et al. |
| 7,924,145 B2 | 4/2011 | Yuk |
| 7,948,337 B2 | 5/2011 | Chu |
| 7,952,566 B2 | 5/2011 | Poupyrev |
| 8,013,961 B2 | 9/2011 | Adachi et al. |
| 8,059,104 B2 | 11/2011 | Shahoian et al. |
| 8,059,105 B2 | 11/2011 | Rosenberg |
| 8,081,156 B2 | 12/2011 | Ruettiger |
| 8,084,968 B2 | 12/2011 | Murray et al. |
| 8,117,912 B2 | 2/2012 | Kawakubo |
| 8,132,468 B2 | 3/2012 | Radivojevic |
| 8,139,038 B2 | 3/2012 | Chueh |
| 8,144,129 B2 | 3/2012 | Hotelling |
| 8,169,332 B2 | 5/2012 | Son |
| 8,169,401 B2 | 5/2012 | Hardwick |
| 8,169,402 B2 | 5/2012 | Shahoian et al. |
| 8,232,969 B2 | 7/2012 | Grant |
| 8,252,695 B2 | 8/2012 | Tan |
| 8,259,066 B2 | 9/2012 | Cheng et al. |
| 8,260,337 B2 | 9/2012 | Periyalwar et al. |
| 8,264,465 B2 | 9/2012 | Grant et al. |
| 8,279,175 B2 | 10/2012 | Kim et al. |
| 8,287,522 B2 | 10/2012 | Moses et al. |
| 8,291,776 B1 | 10/2012 | Pickens |
| 8,296,670 B2 | 10/2012 | Matthews et al. |
| 8,310,350 B2 | 11/2012 | Pfau et al. |
| 8,310,444 B2 | 11/2012 | Peterson et al. |
| 8,310,452 B2 | 11/2012 | Takenaka et al. |
| 8,315,834 B2 | 11/2012 | Gimelfarb et al. |
| 8,319,727 B2 | 11/2012 | Norieda |
| 8,373,664 B2 | 2/2013 | Wright |
| 8,378,798 B2 | 2/2013 | Bells et al. |
| 8,378,965 B2 | 2/2013 | Gregorio et al. |
| 8,400,410 B2 | 3/2013 | Taylor |
| 8,421,567 B2 | 4/2013 | Eckl et al. |
| 8,466,889 B2 | 6/2013 | Tong et al. |
| 8,482,381 B2 | 7/2013 | Chatterjee et al. |
| 8,487,759 B2 | 7/2013 | Hill |
| 8,488,308 B2 | 7/2013 | LeVasseur |
| 8,502,547 B2 | 8/2013 | Philipp |
| 8,525,778 B2 | 9/2013 | Colgate et al. |
| 8,536,978 B2 | 9/2013 | Coggill |
| 8,570,162 B2 | 10/2013 | Ujii |
| 8,570,297 B2 | 10/2013 | Bulea |
| 8,581,901 B2 | 11/2013 | Joshi |
| 8,587,542 B2 | 11/2013 | Moore |
| 8,593,409 B1 | 11/2013 | Heubel |
| 8,610,684 B2 | 12/2013 | Kalu et al. |
| 8,633,901 B2 | 1/2014 | Orr et al. |
| 8,633,911 B2 | 1/2014 | Schediwy et al. |
| 8,633,916 B2 | 1/2014 | Bernstein et al. |
| 8,648,816 B2 | 2/2014 | Homma et al. |
| 8,671,782 B2 | 3/2014 | Mink |
| 8,686,839 B2 | 4/2014 | Posamentier |
| 8,686,961 B2 | 4/2014 | Yamano |
| 8,717,152 B2 | 5/2014 | Bhatia et al. |
| 8,730,199 B2 | 5/2014 | Sleeman et al. |
| 8,760,669 B2 | 6/2014 | Heath et al. |
| 8,783,106 B1 | 7/2014 | Nielson et al. |
| 8,799,827 B2 | 8/2014 | Hinckley et al. |
| 8,810,522 B2 | 8/2014 | Tse |
| 8,830,188 B2 | 9/2014 | Verthein et al. |
| 8,836,648 B2 | 9/2014 | Wilairat |
| 8,854,317 B2 | 10/2014 | Homma et al. |
| 8,884,892 B2 | 11/2014 | Bakker |
| 8,892,051 B2 | 11/2014 | Yi et al. |
| 8,898,564 B2 | 11/2014 | Grant |
| 8,901,783 B2 | 12/2014 | Gregory et al. |
| 8,907,661 B2 | 12/2014 | Maier |
| 8,915,422 B1 | 12/2014 | Harty |
| 8,937,603 B2 | 1/2015 | Flanagan et al. |
| 8,976,537 B2 | 3/2015 | Ito |
| 8,982,051 B2 | 3/2015 | Rosenfeld et al. |
| 9,001,060 B2 | 4/2015 | Harris |
| 9,013,405 B2 | 4/2015 | Kujawski et al. |
| 9,013,430 B2 | 4/2015 | McCann |
| 9,024,907 B2 | 5/2015 | Bolender |
| 9,030,306 B2 | 5/2015 | Lim et al. |
| 9,030,419 B1 | 5/2015 | Freed |
| 9,054,627 B2 | 6/2015 | Bosch et al. |
| 9,086,740 B2 | 7/2015 | Furukawa |
| 9,110,532 B2 | 8/2015 | Ando et al. |
| 9,111,424 B2 | 8/2015 | Lim et al. |
| 9,120,009 B2 | 9/2015 | Bae et al. |
| 9,122,325 B2 | 9/2015 | Peshkin |
| 9,122,345 B2 | 9/2015 | Chen |
| 9,128,523 B2 | 9/2015 | Buuck |
| 9,148,190 B1 | 9/2015 | Buuck et al. |
| 9,158,407 B2 | 10/2015 | Coulson et al. |
| 9,164,605 B1 | 10/2015 | Pirogov |
| 9,182,859 B2 | 11/2015 | Coulson et al. |
| 9,207,801 B2 | 12/2015 | Schediwy et al. |
| 9,222,693 B2 | 12/2015 | Gourlay |
| 9,223,471 B2 | 12/2015 | Buxton |
| 9,262,002 B2 | 2/2016 | Momeyer et al. |
| 9,274,682 B2 | 3/2016 | Hinckley et al. |
| 9,282,893 B2 | 3/2016 | Longinotti-Buitoni et al. |
| 9,298,260 B2 | 3/2016 | Karaoguz |
| 9,304,587 B2 | 4/2016 | Wright et al. |
| 9,348,473 B2 | 5/2016 | Ando |
| 9,349,552 B2 | 5/2016 | Huska |
| 9,360,968 B2 | 6/2016 | Wright |
| 9,372,543 B2 | 6/2016 | Behles |
| 9,389,686 B2 | 7/2016 | Zoller et al. |
| 9,389,688 B2 | 7/2016 | Tossavainen et al. |
| 9,417,695 B2 | 8/2016 | Griffin et al. |

(56) References Cited

U.S. PATENT DOCUMENTS

| | | |
|---|---|---|
| 9,448,626 B2 | 9/2016 | Cruz-Hernandez et al. |
| 9,449,476 B2 | 9/2016 | Lynn et al. |
| 9,454,256 B2 | 9/2016 | Fisher et al. |
| 9,477,342 B2 | 10/2016 | Daverman et al. |
| 9,928,950 B2 | 3/2018 | Lubinski et al. |
| 10,297,119 B1 | 5/2019 | Bard et al. |
| 2004/0080494 A1 | 4/2004 | Fahlman |
| 2007/0152966 A1 | 7/2007 | Krah et al. |
| 2008/0018611 A1 | 1/2008 | Serban et al. |
| 2008/0068343 A1 | 3/2008 | Hoshino et al. |
| 2008/0084384 A1 | 4/2008 | Gregorio et al. |
| 2008/0111791 A1 | 5/2008 | Nikittin |
| 2008/0165159 A1 | 7/2008 | Soss et al. |
| 2008/0191648 A1 | 8/2008 | Ito et al. |
| 2008/0297478 A1 | 12/2008 | Hotelling et al. |
| 2009/0002199 A1 | 1/2009 | Lainonen et al. |
| 2009/0027038 A1 | 1/2009 | Garmire et al. |
| 2009/0102805 A1 | 4/2009 | Meijer et al. |
| 2009/0115734 A1 | 5/2009 | Fredriksson |
| 2009/0167704 A1 | 7/2009 | Terlizzi et al. |
| 2009/0174672 A1 | 7/2009 | Schmidt |
| 2009/0225046 A1 | 9/2009 | Kim |
| 2009/0242282 A1 | 10/2009 | Kim |
| 2009/0293631 A1* | 12/2009 | Radivojevic .............. G01L 1/16 73/774 |
| 2009/0316380 A1 | 12/2009 | Armstrong |
| 2009/0322183 A1 | 12/2009 | Kawakubo |
| 2010/0107067 A1 | 4/2010 | Vaisanen |
| 2010/0141408 A1 | 6/2010 | Doy et al. |
| 2010/0149111 A1 | 6/2010 | Olien |
| 2010/0149124 A1 | 6/2010 | Kim |
| 2010/0164959 A1 | 7/2010 | Brown et al. |
| 2010/0182263 A1 | 7/2010 | Aunio et al. |
| 2010/0214239 A1 | 8/2010 | Wu |
| 2010/0225600 A1 | 9/2010 | Dai et al. |
| 2010/0245254 A1 | 9/2010 | Olien et al. |
| 2010/0328229 A1 | 12/2010 | Weber et al. |
| 2011/0163985 A1 | 7/2011 | Bae et al. |
| 2011/0227872 A1 | 9/2011 | Huska et al. |
| 2012/0013531 A1 | 1/2012 | Wilson |
| 2012/0038568 A1 | 2/2012 | Colloms et al. |
| 2012/0038577 A1 | 2/2012 | Brown et al. |
| 2012/0050230 A1 | 3/2012 | Harris |
| 2012/0062491 A1 | 3/2012 | Coni et al. |
| 2012/0105367 A1 | 5/2012 | Son et al. |
| 2012/0133496 A1 | 5/2012 | Aono |
| 2012/0139860 A1 | 6/2012 | Hotelling et al. |
| 2012/0154315 A1 | 6/2012 | Aono |
| 2012/0182238 A1 | 7/2012 | Lee |
| 2012/0229264 A1 | 9/2012 | Bosch et al. |
| 2012/0235942 A1 | 9/2012 | Shahoian et al. |
| 2012/0319987 A1 | 12/2012 | Woo |
| 2012/0320085 A1 | 12/2012 | Mei et al. |
| 2012/0326981 A1 | 12/2012 | Kurose |
| 2013/0057558 A1* | 3/2013 | Pu et al. ................ G06F 3/038 345/501 |
| 2013/0076652 A1 | 3/2013 | Leung |
| 2013/0154933 A1 | 6/2013 | Sheik-Nainar |
| 2013/0179827 A1 | 7/2013 | Eriksson et al. |
| 2013/0198625 A1 | 8/2013 | Anderson et al. |
| 2013/0222267 A1 | 8/2013 | Almalki |
| 2013/0222289 A1 | 8/2013 | Kwak |
| 2013/0321290 A1 | 12/2013 | Oh |
| 2014/0028575 A1 | 1/2014 | Parivar et al. |
| 2014/0176485 A1 | 6/2014 | Holmberg et al. |
| 2014/0191973 A1 | 7/2014 | Zellers et al. |
| 2014/0197936 A1 | 7/2014 | Biggs et al. |
| 2014/0198071 A1 | 7/2014 | Algreatly |
| 2014/0341420 A1 | 11/2014 | Karkkainen et al. |
| 2014/0347289 A1 | 11/2014 | Suh et al. |
| 2015/0089435 A1 | 3/2015 | Kuzmin |
| 2015/0109223 A1 | 4/2015 | Kessler et al. |
| 2015/0116205 A1 | 4/2015 | Westerman et al. |
| 2015/0130730 A1 | 5/2015 | Harley et al. |
| 2015/0155474 A1 | 6/2015 | Tanimoto et al. |
| 2015/0177899 A1 | 6/2015 | Degner et al. |
| 2015/0192482 A1* | 7/2015 | Araki ..................... G01L 1/225 73/862.627 |
| 2015/0227280 A1 | 8/2015 | Westerman et al. |
| 2015/0234493 A1 | 8/2015 | Parivar et al. |
| 2015/0242037 A1 | 8/2015 | Pedder et al. |
| 2015/0301642 A1 | 10/2015 | Hanaur et al. |
| 2015/0346881 A1* | 12/2015 | Watazu ..................... G01L 1/16 345/174 |
| 2016/0085355 A1 | 3/2016 | Pirogov et al. |
| 2016/0091972 A1 | 3/2016 | Patel et al. |
| 2016/0162030 A1 | 6/2016 | Patel et al. |
| 2016/0162031 A1 | 6/2016 | Westerman et al. |
| 2016/0188010 A1 | 6/2016 | Wright et al. |
| 2017/0268942 A1 | 9/2017 | Pedder et al. |
| 2018/0046307 A1 | 2/2018 | Wells et al. |
| 2019/0025926 A1 | 1/2019 | Harley et al. |
| 2019/0025954 A1 | 1/2019 | Wang et al. |
| 2019/0073003 A1 | 3/2019 | Xu et al. |

FOREIGN PATENT DOCUMENTS

| | | |
|---|---|---|
| CN | 101482785 | 7/2009 |
| CN | 101523329 | 9/2009 |
| CN | 101763193 A | 6/2010 |
| CN | 101833393 | 9/2010 |
| CN | 101868770 | 10/2010 |
| CN | 102047088 | 5/2011 |
| CN | 102084325 | 6/2011 |
| CN | 102084328 | 6/2011 |
| CN | 102144205 | 8/2011 |
| CN | 102339166 | 2/2012 |
| CN | 102426490 | 4/2012 |
| CN | 102640093 | 8/2012 |
| CN | 1496549 | 10/2012 |
| CN | 102713805 | 10/2012 |
| CN | 102870080 | 1/2013 |
| CN | 103097990 | 5/2013 |
| DE | 102010007486 | 8/2011 |
| EP | 2077490 | 7/2009 |
| EP | 2202619 | 6/2010 |
| EP | 2320309 | 5/2011 |
| EP | 2357547 | 8/2011 |
| EP | 2375306 | 10/2011 |
| EP | 2381340 | 10/2011 |
| EP | 2395414 | 12/2011 |
| EP | 2648071 | 10/2013 |
| JP | 2007034991 | 2/2007 |
| JP | WO 2014/017407 A1 * | 1/2014 ............ G01L 1/20 |
| KR | 101274123 | 6/2013 |
| KR | 20130109288 | 10/2013 |
| TW | 201314541 | 4/2013 |
| WO | WO 12/161061 | 11/2012 |
| WO | WO 13/169299 | 11/2013 |
| WO | WO 13/169303 | 11/2013 |
| WO | WO 13/169305 | 11/2013 |
| WO | WO 13/188307 | 12/2013 |
| WO | WO 14/018111 | 1/2014 |
| WO | WO 15/020663 | 2/2015 |

OTHER PUBLICATIONS

Pava et al., "Real Time Platform Middleware for Transparent Prototyping of Haptic Applications," 2004.
Technifast, "Blind Captive Nuts," Jun. 30, 2013, http://www.technifast.co.uk.
Zordan, Enrico et al., "Principle design and actuation of a dual chamber electromagnetic micropump with coaxial cantilever valves," Biomedical Microdevices, Kluwer Academic Publishers, BO, vol. 12, No. 1, Oct. 17, 2009, pp. 55-62.
Product Specification Sheet: GEEPLUS, VIBRO1 Vibration Actuator, 2 pages, www.geeplus.biz, downloaded on Jul. 15, 2015.

* cited by examiner

SECTION A-A

SECTION A-A

SECTION A-A

FORCE SENSOR WITH STRAIN RELIEF

CROSS-REFERENCE TO RELATED APPLICATIONS

This application is a continuation of U.S. patent application Ser. No. 14/550,845, filed Nov. 21, 2014, and titled "Transparent Force Sensor with Strain Relief," which claims priority to U.S. Provisional Patent Application No. 61/976,285, filed Apr. 7, 2014 and titled "Transparent Force Sensor with Strain Relief," U.S. Provisional Patent Application No. 61/926,905, filed Jan. 13, 2014 and titled "Force Sensor Using a Transparent Force-Sensitive Film," U.S. Provisional Patent Application No. 61/937,465, filed Feb. 7, 2014 and titled "Temperature Compensating Transparent Force Sensor," U.S. Provisional Patent Application No. 61/939,257, filed Feb. 12, 2014 and titled "Temperature Compensating Transparent Force Sensor," U.S. Provisional Patent Application No. 61/942,021, filed Feb. 19, 2014 and titled "Multi-Layer Temperature Compensating Transparent Force Sensor," the disclosure of each of which is incorporated by reference in its entirety.

TECHNICAL FIELD

This application generally relates to force sensing and, in particular, to force sensing using a transparent force-sensitive film having one or more strain-relief features.

BACKGROUND

Mobile devices typically include a display screen and one or more components for providing user input to the device. In some cases, it may be advantageous for the user to provide touch input on a surface that overlays the display or other portion of the device. Some traditional touch sensors are configured to detect the presence and location of a touch on a surface using capacitive sensing techniques. However, many traditional touch sensors are not able to determine the magnitude or degree of force associated with a touch.

SUMMARY

One example embodiment includes a transparent force sensor for detecting a force on a surface of a device. The applied force may be due to a touch on an exterior surface of the device. The transparent force sensor may include a transparent force-sensitive film having an array of slit features oriented along a first direction. The transparent force-sensitive film may be formed from a transparent piezoelectric material that exhibits a substantially reduced net charge when strained along a primary direction. The force sensor may also include a display element disposed relative to one side of the transparent force-sensitive film. The force sensor may also be integrated into a user-input device, including, for example, a touch pad, a track pad, a keyboard, and the like.

In some embodiments, the piezoelectric material exhibits a strain-direction dependent charge polarity. In some cases, the piezoelectric material exhibits a positive charge when bent upward along a first strain direction and exhibits a negative charge when bent upward along a second strain direction that is substantially perpendicular to the first strain direction. In some embodiments, the piezoelectric material is a poly-L-lactide (PLLA) or poly-D-lactide (PDLA) polymer film material. The piezoelectric material may be a PLLA polymer material that is drawn into a film sheet.

Some example embodiments are directed to a transparent force sensor having a first electrode disposed above the transparent force-sensitive film and a second electrode disposed below the transparent force-sensitive film. The sensor may also include sense circuitry electrically coupled to the first and second electrodes. In some embodiments, the sense circuitry is configured to detect a change in an electrical property of the transparent force-sensitive film due to the force on the device. In some embodiments, the electrical property is an electrical charge.

Some example embodiments are directed to a transparent force sensor for detecting a force applied to a device, including a cover forming a portion of an exterior surface of the device, and a transparent force-sensitive film disposed below the cover and having an array of strain-relief features oriented along a first direction. The transparent force-sensitive film may be formed from a piezoelectric material that exhibits a substantially reduced net charge when strained along a primary direction. The force sensor may also include a display element disposed below the transparent force-sensitive film. In some cases, the strain-relief features are slit features oriented along the first direction. The strain-relief features may include recessed channel features oriented along the first direction. In some cases, the strain-relief features may include perforated features that are arranged along the first direction.

Some example embodiments are directed to a transparent force sensor, including a first transparent force-sensitive film having an array of slit features oriented along a first direction. The transparent force-sensitive film may be formed from a piezoelectric material that exhibits a substantially reduced net charge when strained along a first primary direction. The sensor may also include a second transparent force-sensitive film having an array of slit features oriented along a second direction. The second transparent force-sensitive film may be formed from a piezoelectric material that exhibits a substantially reduced net charge when strained along a second primary direction. In some cases, the first direction is substantially perpendicular to the second direction. In some cases, the first primary direction is substantially perpendicular to the second primary direction. In some embodiments, the first direction is approximately 45 degrees from the first primary direction and the second direction is approximately 45 degrees from the second primary direction.

In some embodiments, the sensor includes a cover disposed above the first transparent force-sensitive film; and a display element disposed below the second transparent force-sensitive film, wherein the second transparent force-sensitive film is disposed below the first transparent force-sensitive film. The sensor may also include a top electrode disposed above the first transparent force-sensitive film, a middle electrode disposed below the first transparent force-sensitive film, and a bottom electrode disposed below the second transparent force-sensitive film. In some example embodiments, the sensor also includes a first optically-clear adhesive disposed between the top electrode and the first transparent force-sensitive film; and a second optically-clear adhesive disposed between the middle electrode and the first transparent force-sensitive film.

In some embodiments, the sensor includes sense circuitry electrically coupled to the top, middle, and bottom electrodes. The sense circuitry may be configured to detect a change in an electrical property of the first and second transparent force-sensitive films due to the force on the device. In some embodiments, the first transparent force-sensitive film is configured to produce a charge when strained perpendicular to the first direction, and the second transparent force-sensitive film is configured to produce a charge when strained perpendicular to the second direction. In some cases, the sense circuitry is configured to measure a magnitude of the touch.

DETAILED DESCRIPTION

Figure 1:
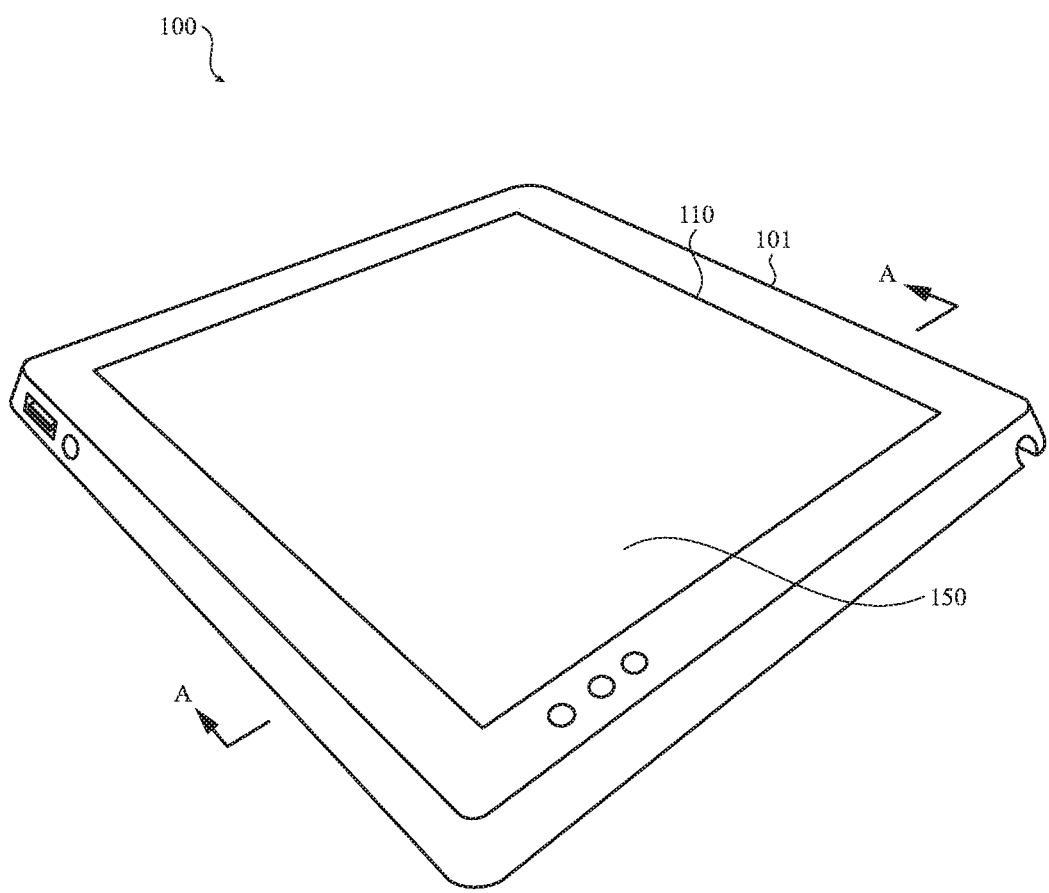
FIG. 1 depicts an example electronic device having a force sensor incorporated with a display element.

In the following description of examples, reference is made to the accompanying drawings in which it is shown by way of illustration specific examples that can be practiced. It is to be understood that other examples can be used and structural changes can be made without departing from the scope of the various examples.

The examples provided herein can be used to detect and measure the force of a user's touch on a device. In particular, the examples include devices and systems for detecting an amount and/or location of a force applied to a device using a force-sensitive film. One example system can include a transparent force-sensitive film for generating an electric charge in response to a deformation of the film. Some embodiments relate to force-sensors that include one or more layers formed from a transparent force-sensitive film for detecting an amount of a force applied to a device. In one example, a transparent force-sensitive film is integrated with, or disposed relative to, a display element of an electronic device. The electronic device may be, for example, a mobile phone, a wearable electronic device, a health monitoring device, a tablet computing device, a computer display, a computing input device (such as a touch pad, keyboard or mouse), a touch pad or screen, one or more buttons, and so on. In some cases, a transparent or non-transparent force-sensitive film is integrated with a non-display component to form a touch-sensitive surface on the surface of an enclosure or other surface of the device. In some embodiments, the force-sensitive film is integrated with a touch pad, touch panel, or other touch-sensitive surface of a device. In one example, the force-sensitive film is integrated with a touch pad of a notepad computer system.

Generally and broadly, a touch may be sensed on a display, enclosure, or other surface of an electronic device using a force sensor, which determines a force of the touch. The estimated magnitude or degree of the force may be used as an input signal or input data to the electronic device. This may permit multiple different inputs through a single touch or input device, such that the response and/or output of the device may vary with the input force. Accordingly, and for example, this may permit a first force exerted on a given point to be interpreted as a first input type or command, while a second force (different in amount from the first) at the same point may be interpreted as a second input type or command. The device's responses or outputs may thus differ in response to the two inputs, even though they occur at the same point and may use the same input device.

The transparent force-sensitive film is typically a compliant material that exhibits an electrical property that is variable in response to deformation or deflection of the film. The transparent force-sensitive film may be formed from a piezoelectric, piezo-resistive, resistive, or other strain-sensitive materials. Transparent resistive films can be formed by coating a substrate with a transparent conductive material. Potential transparent conductive materials include, for example, polyethyleneioxythiophene (PEDOT), indium tin oxide (ITO), carbon nanotubes, graphene, silver nanowire, other metallic nanowires, and the like. Potential substrate materials include, for example, glass or transparent polymers like polyethylene terephthalate (PET) or cyclo-olefin polymer (COP). Typically, when a piezo-resistive or resistive film is strained, the resistance of the film changes as a function of the strain. The resistance can be measured with an electrical circuit. In this way, a transparent piezo-resistive or resistive film can be used in a similar fashion as a strain gauge. If transparency is not required, then other film materials may be used, including, for example, Constantan and Karma alloys for the conductive film and a polyimide may be used as a substrate. Nontransparent applications include force sensing on track pads or the back of display elements.

In some embodiments, the transparent force-sensitive film exhibits a different charge polarity depending on the direction along which the film is strained. As explained in more detail below with respect to FIGS. 2A-C, in some cases, the film may exhibit a substantially zero net charge when the film is bent or deflected up or down along a primary direction. In some cases, the film may exhibit a substantially reduced net charge when strained along a primary direction. For example, the film may exhibit a net charge that is substantially less when strained in the primary direction as compared to other directions.

In some cases, the film may exhibit a strain-direction dependent charge polarity. For example, the film may exhibit a charge having a polarity that is dependent on the direction of the bend with respect to the primary direction. In particular, the charge may have a first polarity when the film is bent up at a first angle with respect to the primary direction and have a second, opposite polarity when the film is bent up at an angle that is, for example, in the opposite direction to the first angle. In one illustrative example, the primary direction may be oriented approximately 45 degrees from an X- and Y-directions (which are perpendicular to each other). Bending the film up along the X-direction may result in a surface charge having a first polarity (e.g., positive or negative). Bending the film up along the Y-direction (perpendicular to the X-direction) may result in a surface charge having a second, opposite polarity (e.g., negative or positive). Example transparent films that exhibit these properties include polylactides polymers, such as poly-L-lactide (PLLA) and poly-D-lactide (PDLA) polymers. In general, transparent and non-transparent force-sensitive films may be referred to herein as "force-sensitive films" or simply "films."

In some embodiments, the force-sensitive film is patterned into an array of lines, pixels, or other geometric elements herein referred to as film elements. The regions of the force-sensitive film or the film elements may also be connected to sense circuitry using electrically conductive traces or electrodes. In general, the force-sensitive film exhibits a measurable change in an electrical property in response to a force being applied to the device. In one example, as a force is applied to the device, one or more of the film elements is deflected or deformed. Sense circuitry, which is in electrical communication or otherwise electrically connected to the one or more film elements or film electrodes, is configured to detect and measure the change in the electrical property of the film due to the deflection. Based on the measured electrical property of the film, an estimated amount of force can be computed. In some cases, the estimated force may represent the magnitude of a touch on the device and be used as an input to a graphical user interface or other aspect of the device.

In some cases, the force-sensitive film is patterned into pixel elements, each pixel element including an array of traces generally oriented along one direction. This configuration may be referred to as a piezo-resistive or resistive strain gauge configuration. In general, in this configuration the force-sensitive-film is a material whose resistance changes in response to strain. The change in resistance may be due to a change in the geometry resulting from the applied strain. For example, an increase in length combined with decrease in cross-sectional area may occur in accordance with Poisson's effect. The change in resistance may also be due to a change in the inherent resistivity of the material due to the applied strain. For example, the applied strain may make it easier or harder for electrons to transition through the material. The overall effect is for the total resistance to change with strain due to the applied force. Also, in a piezo-resistive or resistive strain gauge configuration, each pixel may be formed from a pattern of the force-sensitive-film, aligned to respond to strain along a particular axis. For example, if strain along an x-axis is to be measured, the pixel should have majority of its trace length aligned with the x-axis.

In some embodiments, the force-sensitive film may be formed from a solid sheet of material and is in electrical communication with a pattern of electrodes disposed on one or more surfaces of the force-sensitive film. The electrodes may be used, for example, to electrically connect a region of the solid sheet of material to sense circuitry. This configuration may be referred to as a piezo-strain configuration. In this configuration, the force-sensitive film may generate a charge when strained. The force-sensitive film may also generate different amounts of charge depending on the degree of the strain. In some cases, the overall total charge is a superposition of the charge generated due to strain along various axes.

One or more force-sensitive films may be integrated with or attached to a display element of a device, which may include other types of sensors. In one typical embodiment, the display element also includes a touch sensor configured to detect the location of one or more touches. Using a touch sensor and the transparent force-sensitive film(s) in accordance with some embodiments described herein, the location and magnitude of a touch and a force of a touch on a display element of a device can be estimated.

FIG. 1 depicts an example electronic device 100 having a force sensor integrated into a display element 110. In this example, the electronic device 100 includes a display element 110 mounted in a device housing 101. The display element 110 may be generally referred to as a display and is used to present visual content to the user of the electronic device 100. The display element 110 may include a variety of devices, such as a liquid-crystal display (LCD), a light-emitting diode (LED) display, an organic light-emitting diode (OLED) display, or the like. As explained in more detail below, the electronic device also includes one or more transparent force-sensitive layers 150 that are integrated with the display element 110. In some cases, the display element 110 is disposed on one side of, or relative to, the one or more transparent force-sensitive layers. The one or more force-sensitive layers may be attached to a surface of the display element 110 via one or more other layers including, for example, pressure sensitive adhesive layers, plastic layers, glass layers, conductive layers, or other materials. Also, as described in more detail below with respect to FIGS. 5A-C, more than one force-sensitive film may be used to form a force sensor that is incorporated with the display element 110 of the electronic device 100.

Figure 2A:
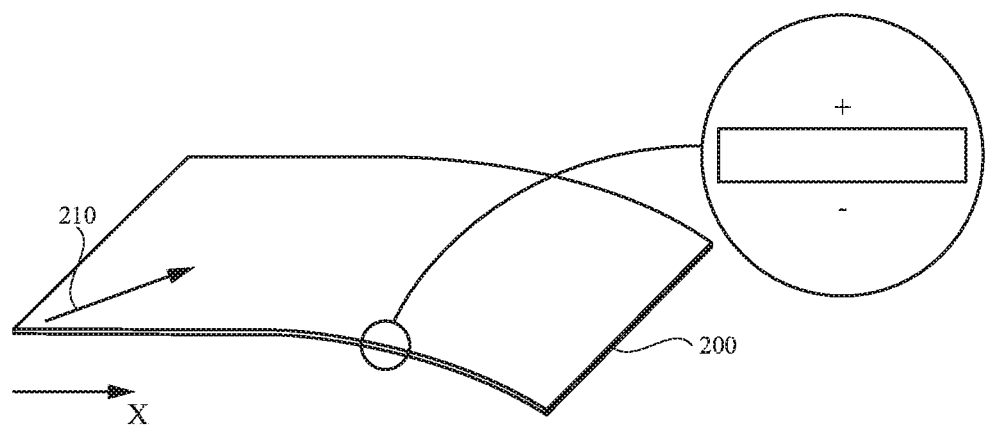
FIGS. 2A-C depict an example of charge characteristics for a transparent force-sensing film having strain-direction dependent charge polarity.
Figure 2B:
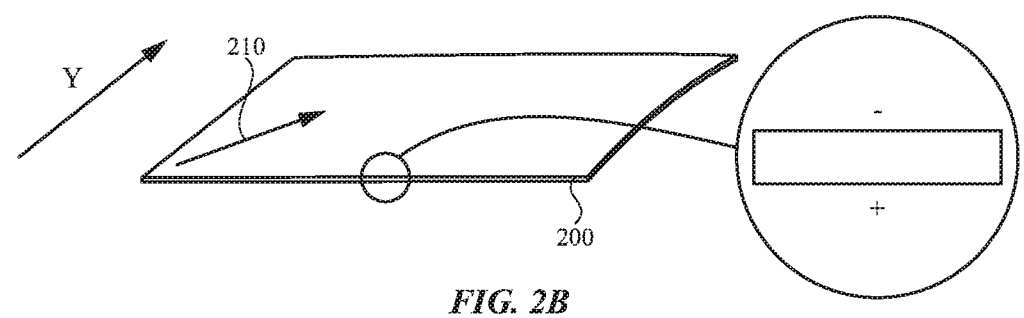
Figure 2C:
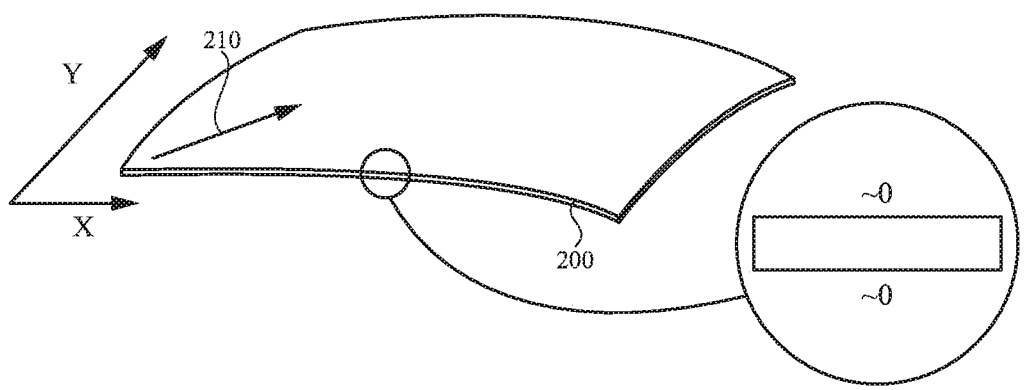

As previously mentioned, the transparent force-sensing film may exhibit a different charge polarity depending on the direction along which the film is strained. FIGS. 2A-C depict an example of charge characteristics for a transparent force-sensing film (film 200) having strain-direction dependent charge polarity. In the following examples, the film 200 is a PLLA piezoelectric film that has been drawn along a primary direction, as indicated by the tensor, primary direction 210 shown in FIGS. 2A-C. In some cases, the orientation of the primary direction is due to a drawing process that substantially aligns the polymer chains of the film along a single (primary) direction.

As shown in FIGS. 2A-B, the film 200 produces a surface charge having a different polarity depending on the direction of the strain with respect to the primary direction 210. In this example, the film 200 produces a positive charge (+) on the top surface of the film 200 in response to the film 200 being bent downward along the X-direction. A negative charge (−) is also produced on the bottom surface of film 200 in response to this deflection.

As shown in FIG. 2B, the charge polarity is reversed when the film 200 is bent downward along the Y-direction. Specifically, the film 200 produces a negative charge (−) on the top surface of the film 200 in response to the film 200 being bent downward along the Y-direction. A positive charge (+) is also produced on the bottom surface of film 200 in response to this deflection. While FIGS. 2A-B depict the charge characteristics of the film 200 when bent downward, a similar reverse polarity will result when the film 200 is bent upward along either the X- or Y-directions.

In this example, if the film 200 is bent upward or downward along the primary direction 210, a zero net charge is produced. In some cases, the film 200 exhibits a substantially reduced net charge when strained along the primary direction 210. The uniaxial strain characteristics of the film 200 may be due to the orientation of the polymer chains, which are substantially aligned with the primary direction 210. The primary direction 210 is depicted in FIGS. 2A-C as being approximately 45 degrees from both the X- and Y-directions, which are substantially perpendicular to each other and generally oriented along the edge of the rectangular sheet. However, this is merely exemplary in nature and in other embodiments the primary direction 210 may be along a different orientation with respect to the X- and Y-directions and the film 200 may be formed from a non-rectangular, curved, or differently shaped sheet.

Furthermore, as shown in FIG. 2C, if the film 200 is bent downward in both the X- and Y-directions, the opposite charges that are created may substantially cancel each other out. In this example, a substantially equal bend in both the X- and Y-directions results in a zero or substantially zero net charge on both the top and bottom surfaces of the film 200. The resulting shape of this deflection may be described as a dome shape, canopy shape, concave shape, or convex shape, depending on the context of the description.

The zero net charge property of the film 200 as depicted in FIG. 2C may be undesirable if the film 200 in used as a force-sensitive film in a touch sensor application. For example, a touch incident on a surface of the device may deform the film into a generally concave shape or depression. Because the resulting charge is substantially net zero (or substantially reduced by the net charge effect) the sensing electronics coupled to the film may not be able to detect the occurrence of the touch and/or the magnitude of the force of the touch.

One solution to this problem may be to provide an array of strain-relief features oriented along one direction of the force-sensitive film. FIGS. 3A-B and FIGS. 4A-B depict force-sensitive films that have an array of strain-relief features substantially oriented along either the X- or Y-directions. By including one or more strain-relief features in the force-sensitive film, strain in the film may be substantially isolated to a single direction. As described in more detail below with respect to the sensor configurations of FIGS. 5A-C, one or more force-sensitive films having strain-relief features may be used to detect the occurrence and magnitude of the force of a touch without the limitations described above with respect to FIG. 2C.

Figure 3A:
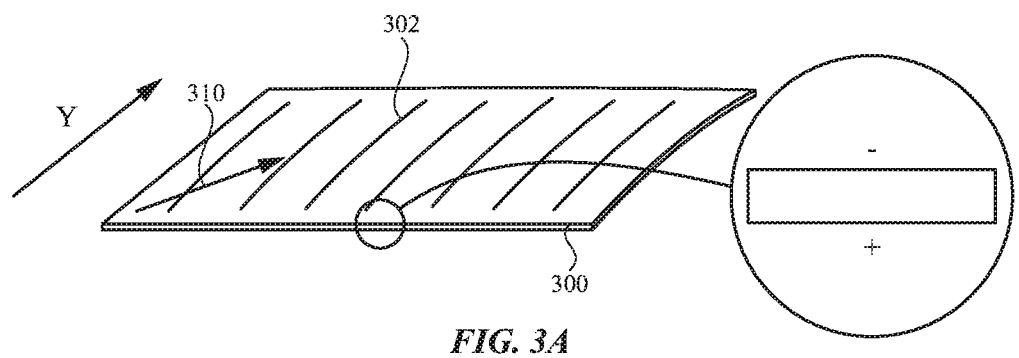
FIGS. 3A-B depict a force-sensitive films having an array of strain-relief features substantially oriented along a Y-direction.
Figure 3B:
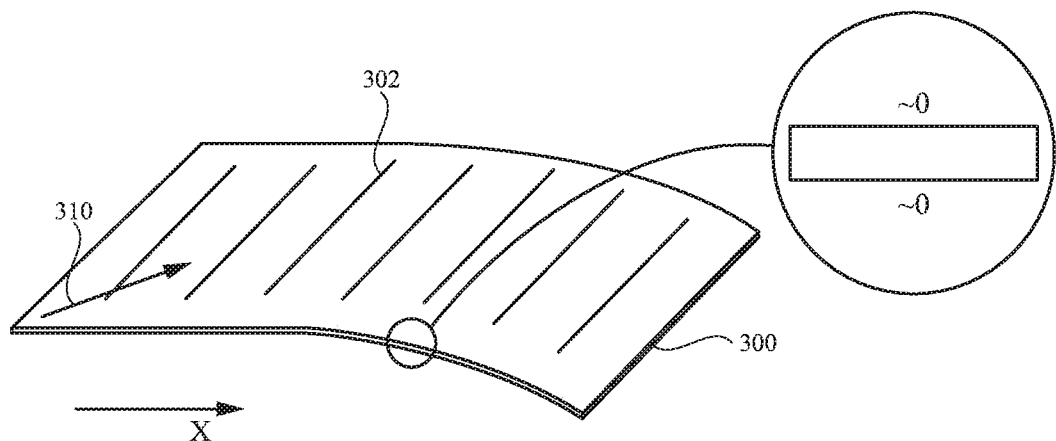

FIGS. 3A-B depict a force-sensitive film (film 300) formed from a piezoelectric material that exhibits a zero or substantially reduced net charge when strained along a primary direction 310. As shown in FIG. 3A, the film 300 may include an array of strain-relief features 302 that are formed as slot features. While the strain-relief features 302 are depicted as slot features, other types of features may also be used. For example, the features may be formed as recessed channel features, perforated hole features, or formed as other types of gaps in the material that substantially relieve strain along one or more directions in the film.

As a result of the strain-relief features 302, the film 300 may exhibit a net charge along a first direction and a zero, substantially zero, or substantially reduced net charge along a different, second direction. As shown in FIG. 3A, the film 300 has strain-relief features that are substantially oriented along a Y-direction. If the film 300 deflected or bent downward along the Y-direction, a negative surface charge (−) is produced on the top surface of the film 300 and a positive surface charge (+) is produced on the bottom surface of the film 300. Similarly, a bend upward along the Y direction will result in a positive surface charge on the top surface and a negative surface charge on the bottom surface of the film 300.

As shown in FIG. 3B, if the film 300 is deflected or bent downward along the X-direction, a zero, substantially zero, or substantially reduced net charge is produced on the top and bottom surfaces of the film 300. Thus, the strain-relief features can be used to isolate the films response to deflections that are substantially along a single direction (in this case the Y-direction). As a result, deflections that occur in both an X- and Y-direction will not result in a zero net charge as discussed above with respect to FIG. 2C. This may be advantageous when detecting or measuring the magnitude of a touch force that results in a concave dome-shaped deflection in the film 300.

Figure 4A:
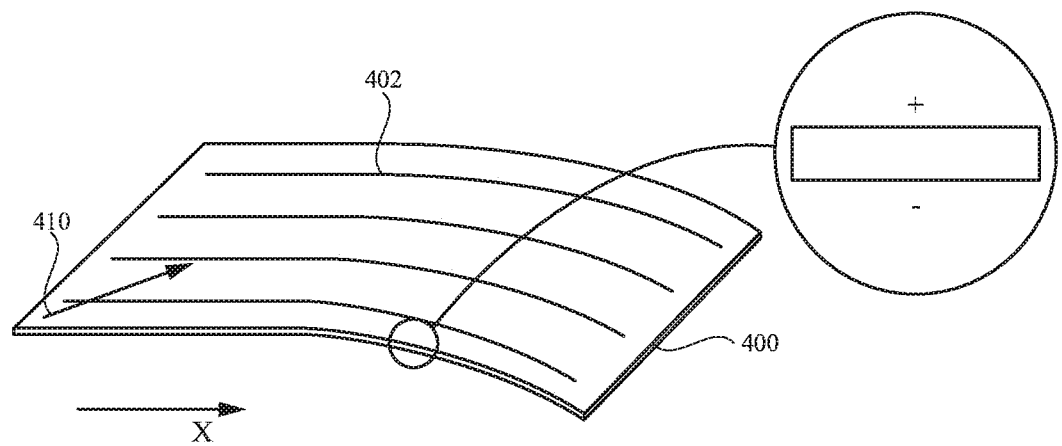
FIGS. 4A-B depict a force-sensitive films having an array of strain-relief features substantially oriented along an X-direction.
Figure 4B:
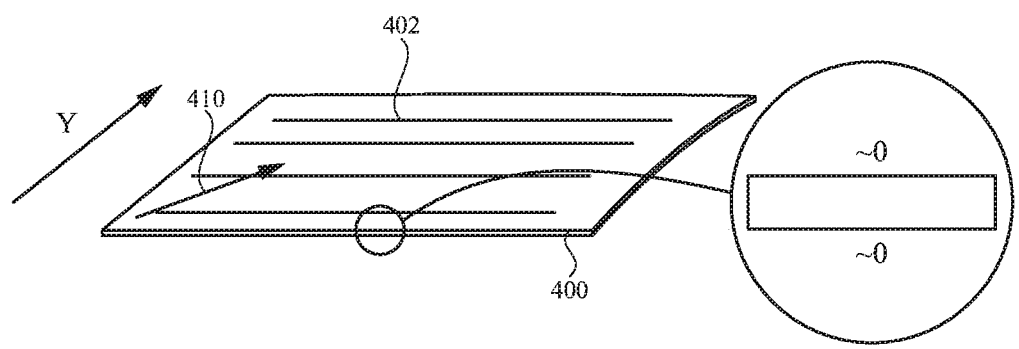

A similar configuration is depicted in FIGS. 4A-B only for a film 400 having strain-relief features 402 oriented along the X-direction (instead of the Y-direction). FIGS. 4A-B also depict a force-sensitive film (film 400) formed from a piezoelectric material that exhibits a zero or substantially reduced net charge when strained along a primary direction 410 (in the absence of strain-relieving features). As shown in FIGS. 4A-B, a bend or deflection of the film 400 along the X-direction results in a positive (or negative) charge on a surface of the film 400. As shown in FIG. 4B, a bend or deflection of the film along the Y-direction results in a zero or substantially zero net charge on the surface of the film 400. Thus, in this example, the strain response of the film 400 may be substantially isolated along the X-direction.

One or more force-sensitive films as described with respect to FIGS. 3A-B and FIGS. 4A-B may be integrated into a force sensor configured to detect and/or measure the magnitude of the force of a touch. In one typical embodiment, the force-sensitive film is integrated with, or placed adjacent to, portions of a display element of a device, herein referred to as a "display stack" or simply a "stack." A force-sensitive film may be integrated with a display stack, by, for example, being attached to a substrate or sheet that is attached to the display stack. Alternatively, the force-sensitive film may be placed within the display stack in certain embodiments. Examples of a force-sensitive film that is integrated with a display stack are provided below, with respect to FIGS. 5A-C. Although the following examples are provided with respect to force-sensitive film integrated with a display stack, in other embodiments, the force-sensitive film may be incorporated with a portion of the device other than the display stack. For example, a similar force-sensitive film configuration may be integrated with a non-display element, such as a track pad, touch pad, or other touch-sensitive surface of the device.

Figure 5A:
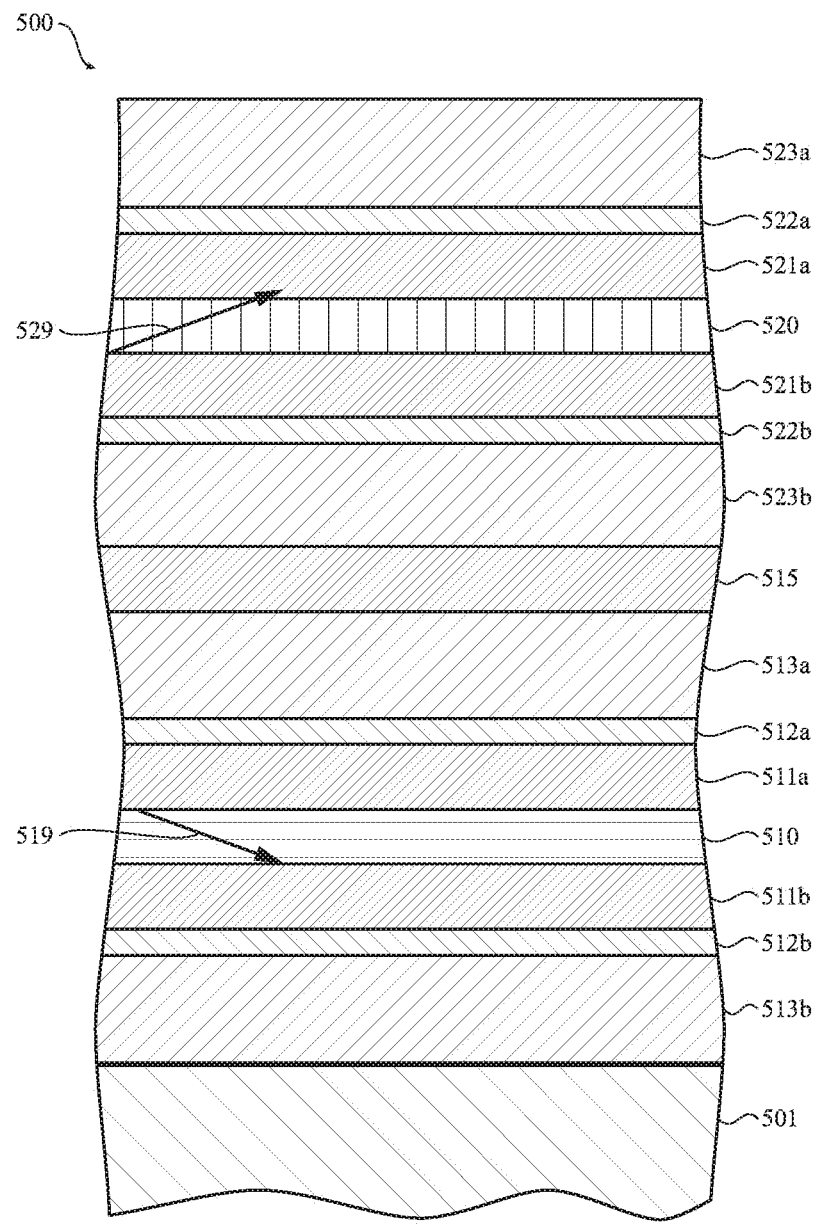
FIGS. 5A-C depict examples of force-sensitive films integrated with a display stack.

FIG. 5A depicts an example of a force-sensitive film integrated into a display stack 500. In this example, the display stack 500 includes a two force-sensitive films 510, 520 that are incorporated with a display element 501. As discussed above, the display element 501 may include, for example an LCD display, an LED display, an OLED display, or the like. In some cases, the display stack 500 is attached directly to a surface of the display element 501. However, in other examples, there may be additional components or layers between the display element 501 and other components of the display stack depicted in FIG. 5A. Furthermore, one or more other components or layers may be disposed on the top of the display stack 500, including, for example, a cover glass layer, another sensor layer, an optical conditioning layer, or other component layers.

The two force-sensitive films 510, 520 are formed from a piezoelectric material that, in an unrelieved sheet form, exhibits a zero or substantially reduced net charge when strained along a primary direction (519, 529). In this example, the (unrelieved) piezoelectric material exhibits a strain-direction dependent charge polarity. In this example both of the force-sensitive films 510, 520 include strain-relief features that are oriented in different directions from each other. In particular, force-sensitive film 510 includes an array of strain-relief features that are substantially oriented along a Y-direction and the force-sensitive film 520 includes an array of strain-relief features that are substantially oriented along an X-direction. As discussed above with respect to FIGS. 3A-B and FIGS. 4A-B, using a film having strain-relief features oriented along one direction may help isolate the strain response of the film in that direction. Accordingly, the force-sensitive film 510, having strain-relief features substantially aligned with the Y-axis can be used to measure strain that occurs primarily in the Y-direction and isolate strain that occurs in directions transverse to the direction of the strain-relief features. Similarly, the force-sensitive film 520, having strain-relief features along the X-axis can be used to measure strain that occurs primarily in the X-direction while eliminating or minimizing strain along directions that are transverse to the direction of the strain-relief features.

In this example, the primary directions 519, 529 of the two force-sensitive films 510, 520 are also oriented differently from each other. In particular, the force-sensitive film 510 is placed in the stack 500 with the primary direction 519 generally oriented −45 degrees from the Y-axis. The other force-sensitive film 520 is placed in the stack 500 with the primary direction 529 generally oriented +45 degrees from the Y-axis. This configuration results in the force-sensitive films 510, 520 having the same electric field direction when strained. As a result, the middle electrodes (522b and 512a) may be to be connected or electrically coupled within the sensor. While the primary directions 519 and 529 are depicted in FIG. 5A as being generally oriented at +/−45 degrees, the primary directions may be in different orientations if the middle electrodes 522b and 512a are independently connected within the sensor. Furthermore, in some cases, it may not be necessary to have both electrodes 522b and 512a, if, for example, there is sufficient capacitive coupling within the stack 500.

In some cases, it may be desirable to measure the strain in both the X- and Y-directions. For example, the sum of the strain in the X- and Y-directions may represent a more robust and reproducible indication of the force applied to the top surface of the stack when boundary conditions may vary. For example, if the stack (in sheet form) is supported only by opposing side edges, the stack will primarily bend and exhibit strain along the unsupported axis. Thus, if only the side edges are supported, the strain will be nonzero only along an axis that is substantially orthogonal to the side edges.

The two force-sensitive films 510, 520 may be used to detect and measure the magnitude of a force on the display stack 500. In particular, the two force-sensitive films 510, 520, as configured in the stack 500 FIG. 5A, may be used to detect a concave depression caused by a touch on the surface of the display stack 500. Furthermore, by using two force-sensitive films 510, 520 having strain relief features that are oriented transverse to each other, the response of the sensor to some deflections may be improved. For example, the use of two force-sensitive films 510, 520 may improve the reliability of sensor which may be subjected to one or more boundary conditions, as discussed above.

As shown in FIG. 5A, the stack 500 includes other components or layers that are arranged in an example configuration. In stack 500, optically clear adhesive (OCA) layers 511a, 511b are disposed on either side of the force-sensitive film 510. Similarly, two OCA layers 521a, 521b are disposed on either side of the other force-sensitive film 520. The OCA layers 511a-b and 521a-b are used to bond or join the adjacent layers to form the stack 500.

As shown in FIG. 5A, the stack 500 also includes a pair of electrode layers for each force-sensitive film. In particular, two electrode layers 512a and 512b are disposed on either side of the force-sensitive film 510. Similarly, two other electrode layers 522a, 522b are disposed on either side of the other force-sensitive film 520. The electrode layers 512a-b and 522a-b may be operatively coupled to sense circuitry that is configure to detect a change in an electrical property, such as charge or current, produced by the deflection of the force-sensitive films 510, 520. The electrode layers 512a-b and 522a-b may be formed from a transparent conductive material, such as indium tin oxide (ITO) layer deposited or formed on a substrate. In this example, the electrode layers 512a-b are formed on respective substrate layers 513a-b, and the electrode layers 522a-b are formed on respective substrate layers 523a-b. The substrate layers 513a-b and 523a-b may be formed from a polyethylene terephthalate (PET) sheet or other transparent sheet material. In this example, an additional OCA layer 515 is used to bond the top and bottom components of the stack 500 together. In some embodiments, the substrate 523a may form the cover of the display stack. In other embodiments, the substrate 523a is attached via one or more other layers to a separate cover element.

Figure 5B:
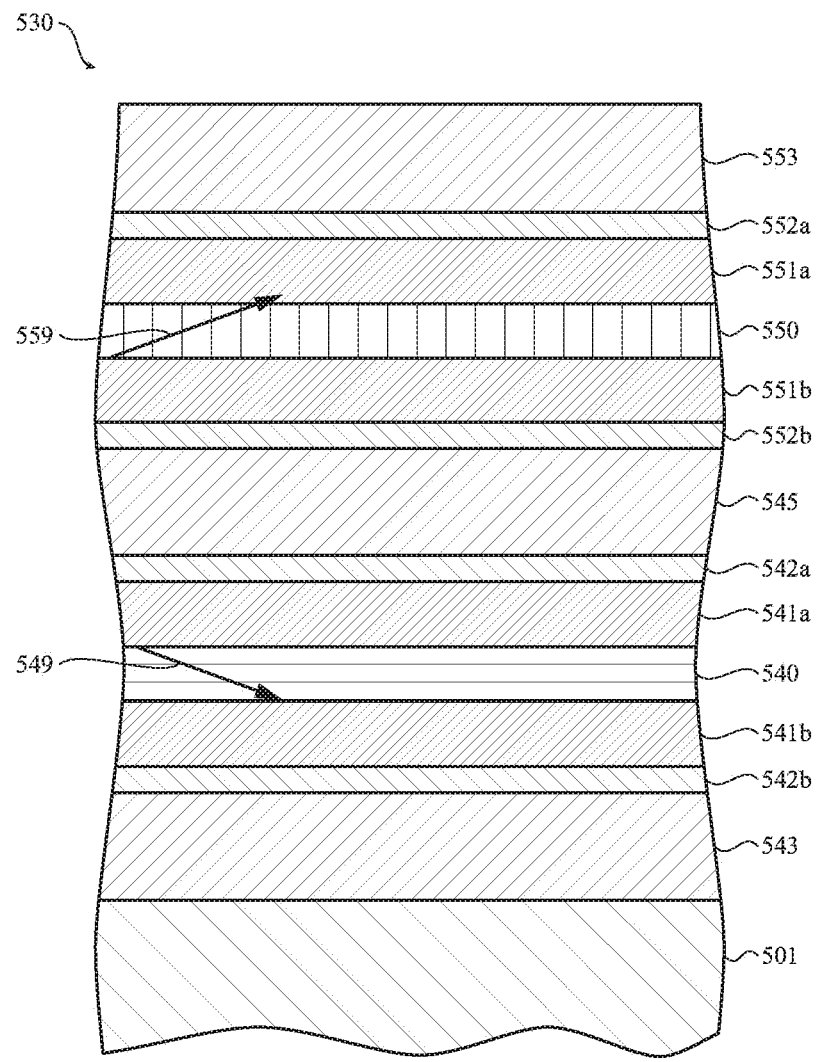
Figure 5C:
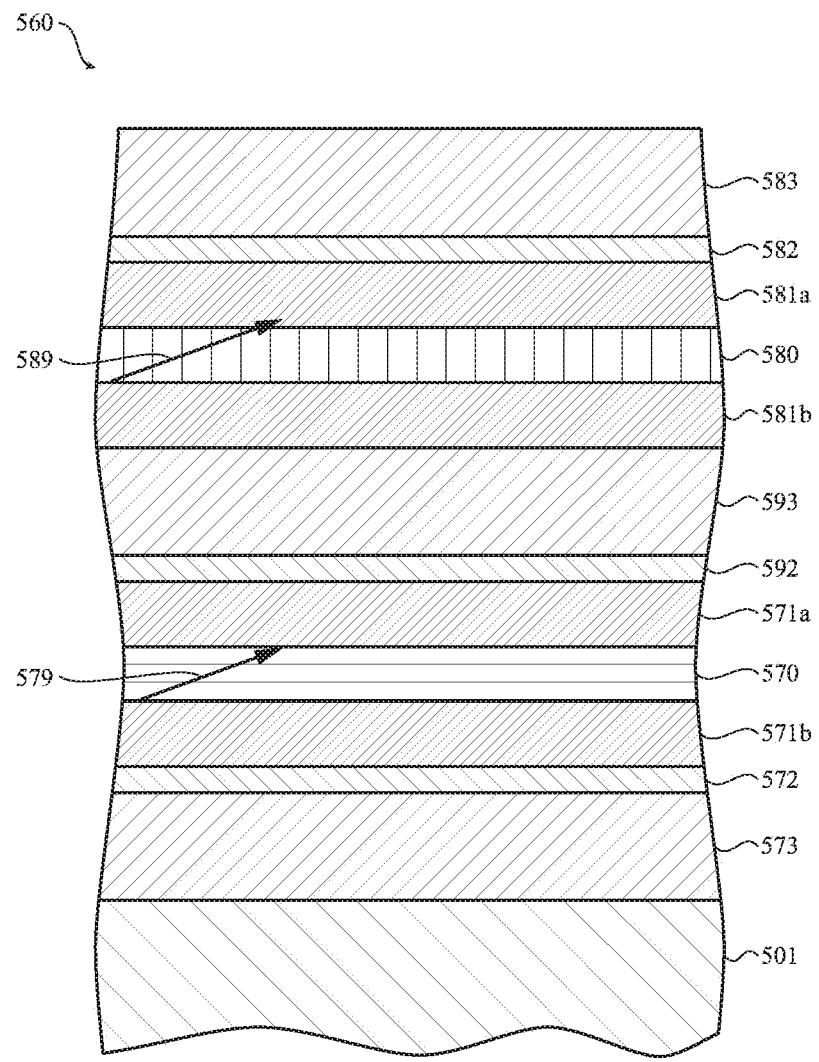

FIG. 5B-C depict example alternative stack configurations. As shown in FIG. 5B, the stack 530 includes two force-sensitive films 540, 550 integrated with a display element 501. Similar to as described above with respect to FIG. 5A, both of the force-sensitive films 540, 550 are formed from a piezoelectric material that exhibits a zero or substantially reduced net charge when strained along a primary direction (549, 559). Also, similar to the previous example, each of the force-sensitive films 540, 550 includes an array of strain-relief features that are oriented transverse to each other. Thus, stack 530 may also be used to detect and measure the magnitude of the force of a touch on the stack 530.

In the example stack 530 depicted in FIG. 5B, electrode layers 552b and 542a are formed on either side of a single substrate layer 545. In one example, the electrode layers 552b and 542a are formed using a double-sided ITO process, also referred to a DITO process. This configuration reduces the number of layers that are required to form a stack and also eliminates the need for a middle OCA layer to bond the top components with the bottom components of the stack. Thus, the stack 530 of FIG. 5B may have a reduced thickness as compared to the stack 500 of FIG. 5A.

As shown in FIG. 5B, the stack 530 also includes OCA layers 541a and 541b disposed on either side of the force-sensitive film 540. Similarly, OCA layers 551a and 551b are disposed on either side of the other force-sensitive film 550. The stack 530 also includes electrode layers 542a and 542b disposed on either side of force-sensitive film 540. Similarly, electrode layers 552a and 552b are disposed on either side of the other force-sensitive film 550. The bottom electrode layers 542a and 542b are formed on substrate layers 545 and 543, respectively. Similarly, the top electrode layers 552a and 552b are formed on substrate layers 553 and 545, respectively. The OCA, electrode, and substrate layers may be formed using materials and techniques similar to those described above with respect to stack 500 of FIG. 5A. In some embodiments, the upper substrate 553 may form the cover of the display stack 530. In other embodiments, the upper substrate 553 is attached via one or more other layers to a separate cover element.

FIG. 5C depicts a third example stack 560. As shown in FIG. 5C, the stack 560 includes two force-sensitive films 570, 580 integrated with a display element 501. Similar to as described above with respect to FIG. 5A, both of the force-sensitive films 570, 580 are formed from a piezoelectric material that exhibits a zero or substantially reduced net charge when strained along a primary direction (579, 589). Also, similar to the two previous examples, each of the force-sensitive films 570, 580 includes an array of strain-relief features that are oriented transverse to each other. Thus, stack 560 may also be used to detect and measure the magnitude of the force of a touch on the stack 560.

In the example stack 560 depicted in FIG. 5C, the two force-sensitive films 570, 580 share a common electrode layer 592, which is formed on substrate layer 593. The common electrode layer 592 may be used as a common electrical ground or reference layer. Alternatively, the outer electrode layers 572 and 582 may be used as ground layers and shield the internal components of the stack 560 from electrical interference. This configuration further reduces the number of layers that are required to form a stack and also eliminates the number of electrode layers that need to be formed. Thus, the stack 560 of FIG. 5C may have a reduced thickness as compared to the stack 500 of FIG. 5A and stack 530 of FIG. 5B.

As shown in FIG. 5C, the stack 560 also includes OCA layers 571*a* and 571*b* disposed on either side of the force-sensitive film 570. Similarly, OCA layers 581*a* and 581*b* are disposed on either side of the other force-sensitive film 580. The stack 560 also includes electrode layer 572 and shared electrode layer 592 disposed on either side of force-sensitive film 570. Similarly, electrode layer 582 and shared electrode layer 592 are disposed on either side of the other force-sensitive film 580. The bottom electrode layer 572 is formed on substrate layer 573 and the top electrode layer 582 is formed on substrate layer 583. The OCA, electrode, and substrate layers may be formed using materials and techniques similar to those described above with respect to stack 500 of FIG. 5A. In some embodiments, the upper substrate 583 may form the cover of the display stack 560. In other embodiments, the upper substrate 583 is attached via one or more other layers to a separate cover element.

Figure 6:
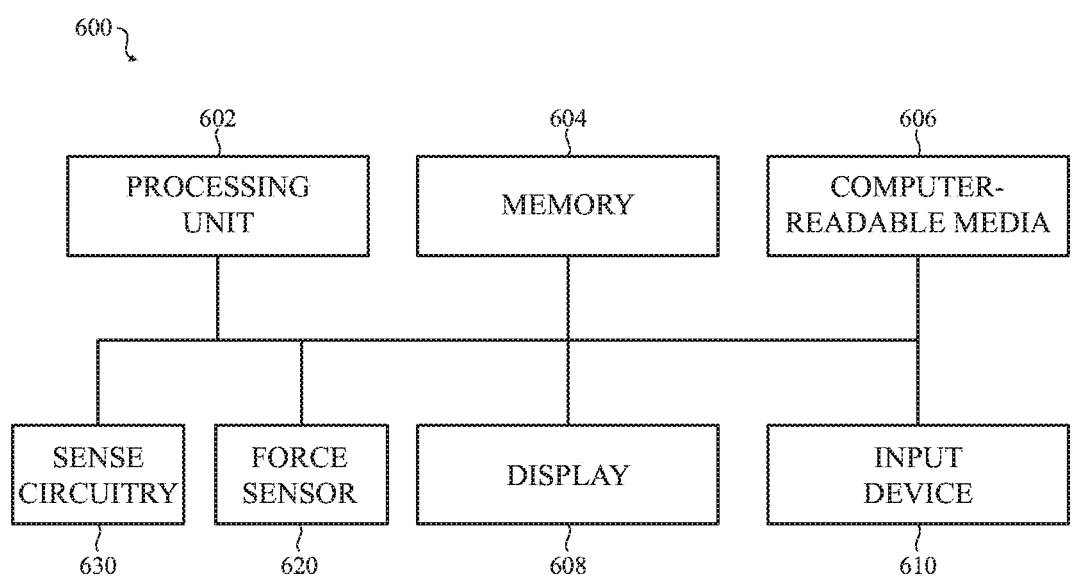
FIG. 6 depicts components of an example electronic device.

FIG. 6 depicts components of an example electronic device 600. The schematic representation depicted in FIG. 6 may correspond to components of the portable electronic devices described above, including the device 100 depicted in FIG. 1. However, FIG. 6 may also more generally represent other types of devices that are configured to use a force sensor. For example, the electronic device 600 may represent a subset of components for a mobile phone, a wearable electronic device, a health monitoring device, a tablet computing device, a notebook computer, a desktop computer.

As shown in FIG. 6, a device 600 includes a processing unit 602 operatively connected to computer memory 604 and computer-readable media 606. The processing unit 602 may be operatively connected to the memory 604 and computer-readable media 606 components via an electronic bus or bridge. The processing unit 602 may include one or more computer processors or microcontrollers that are configured to perform operations in response to computer-readable instructions. The processing unit 602 may include the central processing unit (CPU) of the device. Additionally or alternatively, the processing unit 602 may include other processors within the device including application specific integrated chips (ASIC) and other microcontroller devices.

The memory 604 may include a variety of types of non-transitory computer-readable storage media, including, for example, read access memory (RAM), read-only memory (ROM), erasable programmable memory (e.g., EPROM and EEPROM), or flash memory. The memory 604 is configured to store computer-readable instructions, sensor values, and other persistent software elements. Computer-readable media 606 also includes a variety of types of non-transitory computer-readable storage media including, for example, a hard-drive storage device, solid state storage device, portable magnetic storage device, or other similar devices. The computer-readable media 606 may also be configured to store computer-readable instructions, sensor values, and other persistent software elements.

In this example, the processing unit 602 is operable to read computer-readable instructions stored on the memory 604 and/or computer-readable media 606. The computer-readable instructions may adapt the processing unit 602 to direct or control the sensing and display operations described above with respect to FIG. 7. The computer-readable instructions may be provided as a computer-program product, software application, or the like.

As shown in FIG. 6, the device 100 also includes a display 608 and an input device 610. The display 608 may include a liquid-crystal display (LCD), organic light emitting diode (OLED) display, light emitting diode (LED) display, organic electroluminescence (OEL) display, or other type of display element. If the display 608 is an LCD, the display may also include a backlight component that can be controlled to provide variable levels of display brightness. If the display 608 is an OLED or LED type display, the brightness of the display may be controlled by controlling the electrical signal that is provided to display elements.

The input device 610 is configured to provide user input to the device 100. The input device 610 may represent devices that are configured to provide user input in addition to the force sensor 620 of the device 600, which may also be generally characterized as input devices. The input device 610 may include, for example, touch button, keyboard, key pad, or other touch input device. The device 600 may include other input devices, including, for example, power button, volume buttons, home buttons, scroll wheels, and camera buttons.

As shown in FIG. 6, the device also includes a force sensor 620 that may be configured to detect and measure a force applied to a surface of the device. In accordance with some embodiments described herein, the force sensor 620 may include at least one transparent force-sensitive films that is configured to deflect relative to each other in response to a force applied to a surface of the device. Example force sensitive films are described above with respect to FIGS. 2A-C, 3A-B, and 4A-B. In accordance with some embodiments described herein, the force sensor 620 may include one or more force-sensitive films that are incorporated into a display stack and configured to detect a touch on the cover (glass) of the display. Example display stacks having an incorporated force sensor are described above with respect to the embodiments depicted in FIGS. 5A-C.

As shown in FIG. 6, the device 600 also includes sense circuitry 630 that is operatively coupled to the force sensor 620. In some embodiments, the sense circuitry 630 is configured to detect a change in an electrical property of one or more transparent force-sensitive films of the force sensor 620 due to the force on the device. For example, the sense circuitry 630 may be operatively coupled to a transparent force-sensitive film via one or more electrodes and include circuitry that is configured to detect a change in charge on a surface of the transparent force-sensitive film. The circuitry may include components that may function as charge accumulator or electrical current integrators that may be configured to amplify small changes in current. The circuitry may also include one or more analog to digital converter components for converting an analog charge or voltage signal into a digital signal or output. The sense circuitry 630 may also include memory and one or more programmable components that are used to operate the force sensor 620 and communicate an output of the sense circuitry 630 to the processing unit 602 and/or the memory 604 of the device 600.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. A force sensor for detecting a force of a touch on a display surface of a device, the force sensor comprising:
a first force-sensitive film and a second force-sensitive film, separated by at least one adhesive layer, each force-sensitive film having:
polymer chains substantially aligned in a primary direction in a plane of the respective force-sensitive film such that a strain in the primary direction results in a substantially reduced net charge; and
an array of slit features formed into the respective force-sensitive film and oriented in a first direction that is approximately 45 degrees to the primary direction; wherein:
the array of slit features relieve strain in the respective force-sensitive film allowing the respective force-sensitive film to deflect in a second direction approximately 90 degrees to the first direction; wherein:
the primary direction of the first force-sensitive film is different from the primary direction of the second force-sensitive film; and
the first and second force-sensitive films are transparent.

2. The force sensor of claim 1, further comprising a display element disposed below the first and second force-sensitive films.

3. The force sensor of claim 1, wherein each force-sensitive film is formed from a piezoelectric material that exhibits a strain-direction dependent charge polarity.

4. The force sensor of claim 1, wherein each force-sensitive film is formed from a piezoelectric material that exhibits a positive charge when bent upward in a first strain direction and exhibits a negative charge when bent upward in a second strain direction that is substantially perpendicular to the first strain direction.

5. The force sensor of claim 1, wherein each force-sensitive film is formed from a piezoelectric material that comprises one or more of: a poly-L-lactide (PLLA) or a poly-D-lactide (PDLA) polymer film material.

6. The force sensor of claim 1, further comprising:
a first electrode disposed above the first force-sensitive film;
a second electrode disposed below the first force-sensitive film; and
sense circuitry electrically coupled to the first and second electrodes, wherein the sense circuitry is configured to detect a change in an electrical property of the first force-sensitive film due to the force on the device.

7. The force sensor of claim 6, wherein the electrical property is an electrical charge.

8. A force sensor for detecting a force applied to a display surface of a device, the force sensor comprising:
a cover forming a portion of an exterior surface of the device;
a first transparent force-sensitive film and a second transparent force-sensitive film with anisotropic strain properties disposed in a stack below the cover and each transparent force-sensitive film having:
a primary direction oriented in a plane of the respective transparent force-sensitive film for which a strain in the primary direction results in a substantially reduced net charge;
an array of strain-relief features formed into the respective transparent force-sensitive film and oriented in a first direction that is transverse to the primary direction thereby allowing the respective transparent force-sensitive film to deflect in a direction approximately perpendicular to the first direction; and
a display element disposed below the stack of transparent force-sensitive films; wherein:
the primary direction of the first transparent force-sensitive film is different from the primary direction of the second transparent force-sensitive film.

9. The force sensor of claim 8, wherein the strain-relief features of the first transparent force-sensitive film are slit features oriented in the first direction of the first transparent force-sensitive film.

10. The force sensor of claim 8, wherein the strain-relief features of the first transparent force-sensitive film are recessed channel features oriented in the first direction of the first transparent force-sensitive film.

11. The force sensor of claim 8, wherein the strain-relief features of the first transparent force-sensitive film are perforated features that are arranged in the first direction of the first transparent force-sensitive film.

12. The force sensor of claim 8, wherein the first direction of the first transparent force-sensitive film is approximately 45 degrees from the primary direction of the first transparent force-sensitive film.

13. The force sensor of claim 8, wherein each transparent force-sensitive film comprises polymer chains substantially aligned in the primary direction in a plane of the force-sensitive film.

14. A force sensor for detecting a force of a touch on a display of a device, the force sensor comprising:
a first transparent force-sensitive film having:
polymer chains oriented in a first primary direction in a plane of the first transparent force-sensitive film, such that a strain in the first primary direction results in a substantially reduced net charge;
an array of strain-relief features formed into the first transparent force-sensitive film and oriented in a first direction that is transverse to the first primary direction; and
a second transparent force-sensitive film, separated from the first transparent force-sensitive film by an adhesive layer and having:
polymer chains oriented in a second primary direction in a plane of the second transparent force-sensitive film, such that a strain in the second primary direction results in a substantially reduced net charge; and
an array of strain-relief features formed into the second transparent force-sensitive film oriented in a second direction that is transverse to the second primary direction; wherein
each of the first and the second transparent force-sensitive films are formed from a material that exhibits a strain-direction dependent charge polarity;
the first direction is substantially perpendicular to the second direction; and
the first primary direction is different from the second primary direction.

15. The force sensor of claim 14, wherein the array of strain-relief features formed into the first transparent force-sensitive film allow the first transparent force-sensitive film to deflect in a direction approximately perpendicular to the first direction.

16. The force sensor of claim 14, wherein the first primary direction is substantially perpendicular to the second primary direction.

17. The force sensor of claim 14, wherein the first direction is approximately 45 degrees from the first primary direction and the second direction is approximately 45 degrees from the second primary direction.

18. The force sensor of claim 14, further comprising:
a cover disposed above the first transparent force-sensitive film; and
a display element disposed below the second transparent force-sensitive film, wherein the second transparent force-sensitive film is disposed below the first force-sensitive film.

19. The force sensor of claim 14, further comprising:
a top electrode disposed above the first transparent force-sensitive film;
a middle electrode disposed below the first transparent force-sensitive film;
a bottom electrode disposed below the second transparent force-sensitive film; and
sense circuitry electrically coupled to the top, middle, and bottom electrodes, wherein the sense circuitry is configured to detect a change in an electrical property of the first and second transparent force-sensitive films due to the force on the device.

20. The force sensor of claim 19, wherein the first transparent force-sensitive film is configured to produce a charge when strained perpendicular to the first direction, and the second transparent force-sensitive film is configured to produce a charge when strained perpendicular to the second direction.

* * * * *